United States Patent [19]

Stroud

[11] Patent Number: 4,473,236
[45] Date of Patent: Sep. 25, 1984

[54] PEDAL DRIVE MECHANISM

[75] Inventor: Edward A. Stroud, Toronto, Canada

[73] Assignee: Stroudex Systems Inc., Brampton, Canada

[21] Appl. No.: 378,138

[22] Filed: May 14, 1982

[51] Int. Cl.³ .............................................. B62M 1/04
[52] U.S. Cl. .................................... 280/258; 280/254
[58] Field of Search ............... 280/258, 254, 255, 256, 280/257, 253, 260

[56] References Cited

U.S. PATENT DOCUMENTS

| | | | |
|---|---|---|---|
| 587,837 | 8/1897 | Latimer | 280/258 |
| 2,141,233 | 12/1938 | Alexander | 280/253 |
| 2,383,000 | 8/1945 | McLean | 280/258 |
| 4,063,747 | 12/1977 | Young | 280/255 |

Primary Examiner—Joseph F. Peters, Jr.
Assistant Examiner—Donn McGiehan
Attorney, Agent, or Firm—Sim & McBurney

[57] ABSTRACT

For a vehicle such as a bicycle having a frame and at least one drive wheel, a driving sprocket, and an endless chain connecting the sprocket to the drive wheel, an improved propelling mechanism having two longer than usual pedal arms pivotally mounted on either side of the frame for swinging movement over an arc of less than 180°, and a slip-clutch between each pedal arm and the driving sprocket. The mechanism is such as to positively raise one pedal arm as the other is depressed. Preferably, first and second arcuate toothed members are secured to the respective pedal arms, and a first gear meshes with the first toothed member. The first gear is fixedly mounted to a transverse rotary shaft on which is also fixedly mounted a second gear. The second gear meshes with a third gear which in turn meshes with the second toothed member.

10 Claims, 3 Drawing Figures

PEDAL DRIVE MECHANISM

This invention relates generally to improvements in pedalled vehicles, and in particular to bicycles. Specifically, this invention has to do with an improvement in the pedalling mechanism per se, in which the pedals are not rotated in a circle as in conventional bicycle construction, but instead move over only a limited arc. This allows the downward force exerted by the person driving the bicycle to be converted to torque at the driving wheel with maximized efficiency.

BACKGROUND OF THIS INVENTION

The standard or conventional bicycle construction is well known. It consists of a frame, a steerable wheel at the front of the frame, a driving wheel at the rear of the frame, a seat, handlebars for steering the steerable wheel, and two pedals mounted at either side of the frame between the wheels. The pedals are locked together on a single rotating shaft, and extend in diametrically opposite directions, so that when one pedal is up the other is down. In the simplest form of conventional bicycle, a sprocket wheel is keyed to the shaft turned by the pedals, and a driving chain is entrained around the sprocket and a driven sprocket which is fixed at the hub of the rear wheel to turn therewith.

More recently, 3-speed, 5-speed and 10-speed bicycles have been developed, but all of these utilize the same circular motion for the pedals, which turn one or more drive sprockets keyed to the pedal shaft.

Occasional attempts have been made to devise an alternative pedalling scheme, since it is universally recognized that the circular motion of the pedals in a conventional bicycle represent a substantial inefficiency, since no conversion of downward force to rotational torque can take place when the pedals are at or near the top or bottom dead center positions.

An example of pedals mounted to rotate through a limited arc can be seen in U.S. Pat. No. 2,141,233, issued Dec. 27, 1938 to C. S. Alexander. In the Alexander structure, however, and in any other limited arc pedal construction of which I am aware, there is not provided a simple, safe and reliable means of ensuring that when one pedal moves downwardly the other one moves upwardly.

It is to be emphasized that such positive uplift of the one pedal while the other is depressed is an important factor for the comfort and ease of the person riding the bicycle. To begin with, all standard bicycles have circularly rotating pedals extending at 180° from each other, which automatically ensures that as the one pedal is depressed, the other is raised. Virtually every person who has ever ridden a bicycle has become used to allowing the non-working foot to simply rest on the pedal that is being raised, while the other foot presses downwardly on the working pedal. The procedure then alternates, and the previously working foot rests on its pedal as the latter is being raised.

Without some mechanism or device which ensures that one pedal will be raised as the other is depressed, there is a necessity for providing some resilient means for biasing the pedal in the upward direction. This is a disadvantage in that, when that pedal becomes the working pedal and is pressed downwardly, the rider loses some of his energy to overcoming the resilient biasing means. A more important disadvantage, however, is that the rider may forget to raise his non-working foot as the other is forced downwardly, and thus when it comes time for the non-working foot to become the working foot, the respective pedal is not in the appropriate uppermost position.

It can be seen, therefore, that important advantages would accrue in a structure which firstly employed pedal arms operating over a limited arc (thus avoiding the waste of energy at the top and bottom dead center positions) and which moreover provided a non-resiliently biased but positive "restoring" for the non-working pedal, so that it will be raised to its upper-most position as the working pedal is depressed.

Idealy, the mechanism would be one and the same for both pedals. In other words, the same structure would operate to raise one pedal as the other were depressed, and then would continue to function as the pedals were reversed.

GENERAL DESCRIPTION OF THIS INVENTION

Accordingly, it is an aspect of this invention to provide a pedal propelling mechanism for a bicycle, in which the pedals move only through a limited arc, and which incorporates a restoring mechanism allowing the downward movement of one pedal to require the upward movement of the other, and vice-versa.

This invention therefore provides an improvement propelling mechanism in a vehicle having a frame, at least one drive wheel, a driving sprocket, and endless means drivingly connecting the sprocket to the drive wheel. The mechanism includes two pedal arms pivotally mounted on either side of the frame for swinging movement in an arc of less than a 180°, and further provides slip-clutch means between each pedal arm and the driving sprocket. Means are provided for positively raising one pedal arm as the other is depressed. In a preferred embodiment, the latter means includes first and second arcuate toothed members secured to the respective pedal arms. A first gear meshes with the first toothed member, the first gear being fixedly mounted to a transverse rotary shaft on which is also fixedly mounted a second gear. The second gear meshes with a third gear which also meshes with the second toothed member.

GENERAL DESCRIPTION OF THE DRAWINGS

One embodiment of this invention as illustrated in the accompanying drawings, in which like numerals denote like parts throughout the several views, and in which.

DETAILED DESCRIPTION OF THE DRAWINGS

Figure 1:
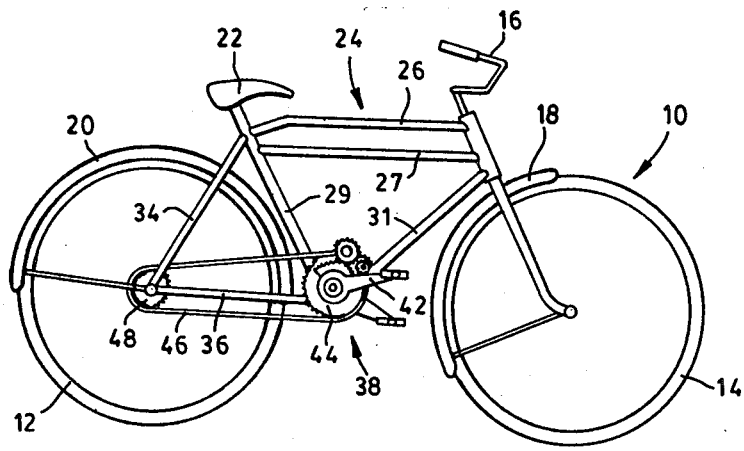
FIG. 1 is an elevational view of a bicycle to which the mechanism of this invention has been applied.

Attention is first directed to FIG. 1, which shows a bicycle 10 having a rear drive wheel 12, a forward steering wheel 14, handlebars 16 locked to the steering wheel 14, a forward fender 18, a rearward fender 20, a seat 22, and a frame shown generally at 24 and including two upper members 26 and 27, a rearward member 29, a forward member 31, a rear wheel fork 34, and a rear hub brace 36. In FIG. 1 the pedalling mechanism is shown generally at 38, and includes a left pedal 41 and a right pedal 42. The pedals 41 and 42 are adapted to rotate a sprocket 44, around which is entrained an endless chain 46, which in turn is entrained around a rear wheel drive sprocket 48 in conventional manner.

Figure 2:
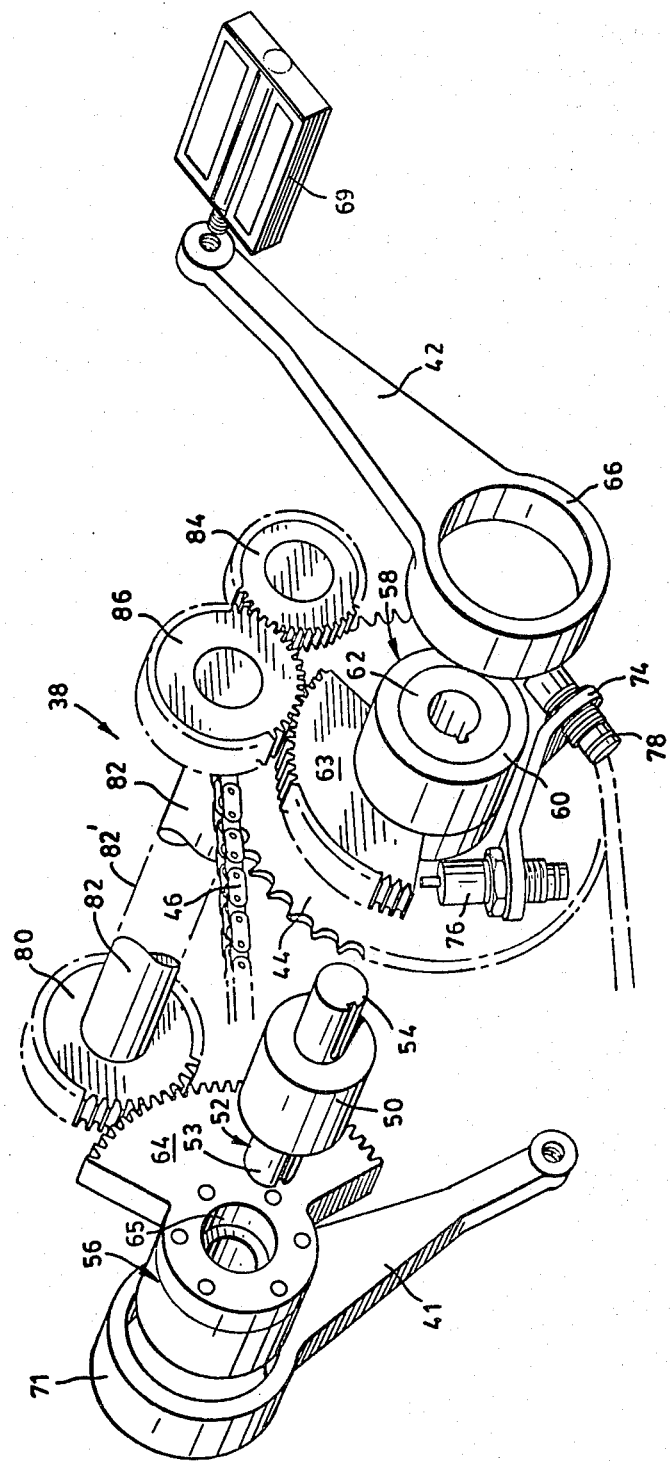
FIG. 2 is an exploded, somewhat schematic view of the mechanism forming the focus of this invention.

Attention is now directed to FIG. 2, for a more detailed description of the mechanism 38.

In FIG. 2, the numeral 50 designates a mounting member which is intended to be secured rigidly to the frame 24. Rotably mounted within the mounting member 50, on suitable bearings (not shown) is a shaft 52 having two end portions 53 and 54. The numeral 56 designates one of two slip clutches, the other one being shown at 58. Each slip-clutch 56, 58 includes an outer housing 60, and an inner sleeve 62 which is mounted for rotation within the outer housing 60, but is permitted to rotate only in one direction. The construction of a slip clutch is conventional and does not need to be described in detail as it forms no part of the focus of this invention. The inner sleeve of each slip clutch 56, 58 is keyed to its respective end portion 53, 54 of the shaft 52. Bolted to the housing 60 of the slip clutch 58 is a first arcuate toothed member 63. Bolted to the housing of the slip-clutch 56 is a second arcuate toothed member 64, which does not engage the shaft 52, having an opening 65 large enough to receive the shaft 52 without contact. The pedal arm 42 is integral with a hub 66 which is adapted to receive the slip-clutch 58 and to be affixed thereto, either by shrink fit, force fit, or direct fastening. Thus, the housing 60 of the slip-clutch 58 moves always with the hub 66 and the pedal arm 42. At the distal end of the pedal arm 42 is a conventional pedal 69 having a standard connection thereto.

In like manner, the pedal arm 41 is integral with a hub 71 which is sized to receive the housing of the slip-clutch 56, and to be affixed thereto so that the pedal arm 41 and the housing of slip clutch 56 move together. It will thus be appreciated that the pedal arm 41 is fixed with respect to the arcuate toothed member 64, while the pedal arm 42 is fixed with respect to the arcuate toothed member 63.

The sprocket 44 has a boss (not visible in FIG. 2) by which it is fixedly secured to the end portion 54 of the shaft 52, to rotate therewith.

The parts thus far described with reference to FIG. 2 allow the pedal arms 41 and 42, each independently, to urge rotation of the shaft 52 and thus of the sprocket 44. The remaining portions now to be described have the effect of locking the pedal arms 41 and 42 together in such a manner that depression of one means raising of the other and vice versa.

Before describing these parts, however, attention is directed to flange 74, in FIG. 2, which supports two hydraulic shock absorbing elements 76 and 78, the former providing a resilient limit stop for the arcuate toothed member 63 when the pedal arm 42 is at its uppermost position, the latter providing a resilient limit stop for the arcuate toothed member 63 when the pedal arm 42 is in its lowermost position.

Because of the interaction of the elements about to be described, it is not necessary to provide additional shock absorbing limit stops for the arcuate toothed member 64.

In accordance with this invention, the interlocking means for the pedal arms 41 and 42 includes a first gear 80 which meshes with the arcuate toothed member 64. The first gear 80 is fixedly mounted to a transverse rotary shaft 82 on which is also fixedly mounted a second gear 84. In the exploded view of FIG. 2, the shaft 82 could not be shown in its normal dimension. Broken lines 82' define the direction along which the shaft 82 extends. The second gear 84 does not mesh with the arcuate toothed member 63, but instead meshes with a third gear 86 which in turn does mesh with the arcuate toothed member 63.

It will be appreciated that, if the gear 86 were removed, and if the gear 84 were made to mesh with the arcuate toothed member 63, then the pedal arms 41 and 42 would move together in tandem rather than oppositely. By providing the intermediate or third gear 86, opposite rotation of the pedal arms 41 and 42 is required.

It will be appreciated that, if the arcuate toothed members 63 and 64 had the same pitch diameter (distance from the axis to the pitch circle of the teeth), and assuming that the shafts 52 and 82 were parallel, the gear 84 could not be the same size as the gear 80, since if it were then its teeth would mesh with the teeth of the arcuate toothed member 63. Since such meshing must not take place, the gear 84 and the arcuate toothed member 63 must be separated from one and other.

If the arcuate toothed members 63 and 64 remained the same size, and the gear 84 were simply made smaller i.e. given a smaller pitch diameter, then a problem would arise in that radial movement of the two pedal arms 41 and 42 would be unequal. Specifically, the pedal arm 42 would move at a slower rate than the pedal arm 41, which would mean that they would not cover the same arcs between their limit positions. Since this is highly undesirable, an arrangement must be made by which the gear 84 stays out of contact with the arcuate toothed member 63, but at the same time the radial speeds and the total arc of movement of the two pedal arms 41 and 42 must remain the same.

This is accomplished by also decreasing the size of the pitch diameter of the arcuate toothed member 63. In order to ensure that the movements and the total arcs covered by the pedal arms 41 and 42 are exactly the same, it is necessary that the pitch diameter ratio for the toothed members 63 and 64 be the same as the pitch diameter ratio of the first and second gears 80 and 84. Put a different way, the ratio of the pitch diameter of the first gear 80 to the pitch diameter of the second gear 84 must be the same as the ratio of the pitch diameter of the toothed member 64 to the pitch diameter of the toothed member 63. The size of the third gear 86 does not effect the motion of the pedal arms 41 and 42, but it can conveniently have the same pitch diameter as the gear 84, hence the same number of teeth.

Figure 3:
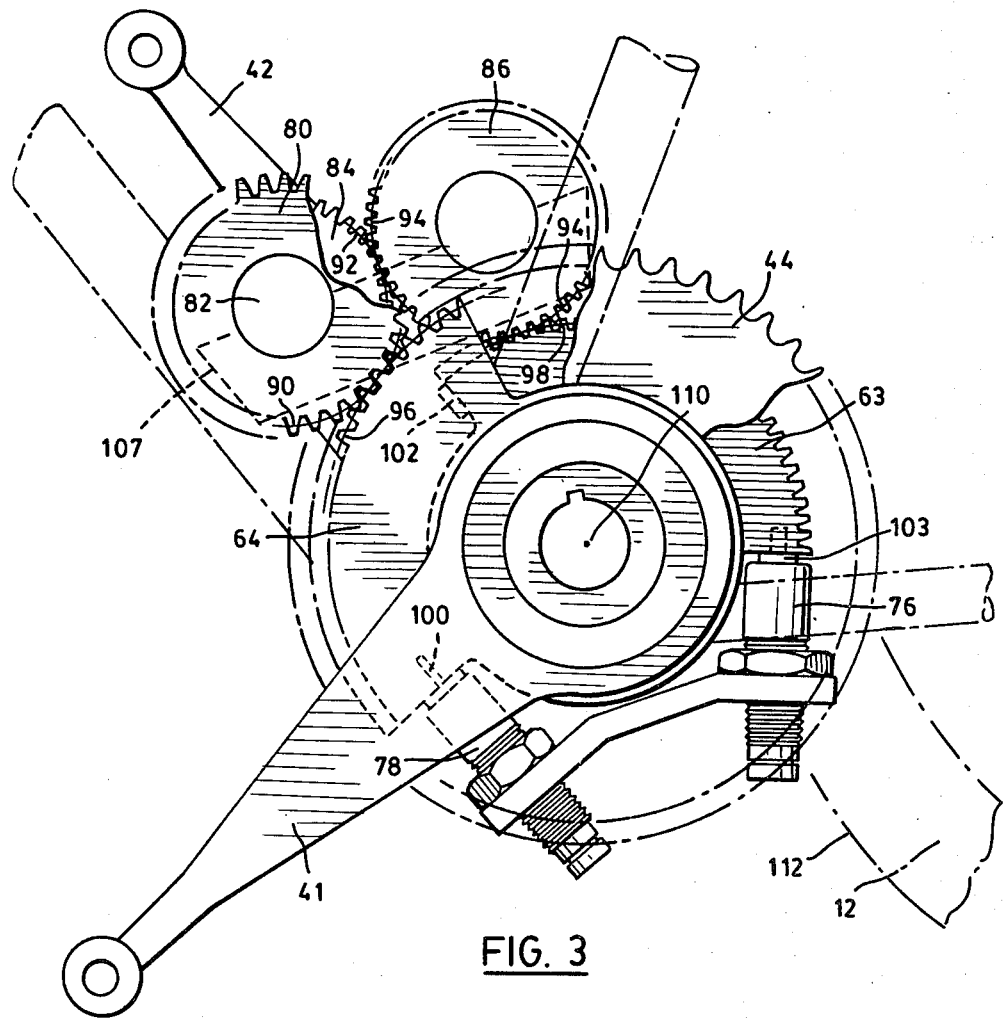
FIG. 3 is an elevational view, to a larger scale, of the mechanism of this invention.

In the somewhat schematic view shown in FIG. 3, the pitch circles of the various elements are identified. The pitch circles 90 is that of the first gear 80, while the pitch circle 92 is that of the second gear 84. The pitch circle 94 is that of the third gear 86. As is well known, two meshing gears have pitch circles which are tangent to one and other. In FIG. 3, the pitch circle 90 is seen to be tangent to a pitch circle 96 which is that of the arcuate toothed member 64. The pitch circle 94 is tangent to the pitch circle 98, which is that of the arcuate toothed member 63. The shock absorbing members 76 and 78 include outwardly and resiliently biased pins 100, which are adapted to be depressed by contact elements 102 and 103 affixed to the arcuate toothed member 63. Shown in broken line in FIG. 3, and somewhat schematically, is a support member 107 which is adapted to support the shafts on which the gears 80, 84 and 86 rotate.

As can be seen in FIG. 3, the center axis 110 of the pedal arms 41 and 42 is placed as far to the rear as possible, while still allowing a clearance to the tire 112 of the rear wheel 12. This construction allows the pedal arms 41 and 42 to be somewhat longer than the standard pedal arms of a conventional bicycle construction. The longer pedal arm length is also permitted due to the fact that the pedal arms do not undergo full 360° rotation. In FIG. 3 it can be seen that the pedal arms rotate through an arc of approximately 90°. It will be understood, however, that other arc ranges may be selected.

By increasing the lengths of the pedal arms 41 and 42, a maximization of the conversion of downward thrust into torque at the rear wheel can be obtained.

While a particular embodiment of this invention has been illustrated in the drawings and disclosed hereinabove it will be apparent to those skilled in the art that changes and modifications may be made therein without departing from the essence of this invention as set forth in the appended claims.

I claim:

1. In a vehicle having a frame, at least one drive wheel, a driving sprocket, and endless means connecting the sprocket to the drive wheel:

an improved propelling mechanism comprising:

two pedal arms pivotally mounted on either side of the frame for swinging movement over an arc or less than 180°, slip-clutch means between each pedal arm and the driving sprocket, and means for positively raising one pedal arm as the other is depressed, said means including first and second arcuate toothed members secured to the respective pedal arms, a first gear meshing with the first toothed member, the first gear being fixedly mounted to a transverse rotary shaft on which is also fixedly mounted a second gear, the second gear meshing with a third gear which also meshes with the second toothed member.

2. The invention claimed in claim 1 in which the pitch diameter of the first toothed member is greater than that of the second toothed member, and in which the pitch diameter of the first gear is greater than that of the second gear, the pitch diameter ratio for the toothed members being the same as the pitch diameter ratio of the first and second gears.

3. The invention claimed in claim 3, in which the third gear has the same pitch diameter as the second gear.

4. The invention claimed in claim 1 or claim 2, in which the swing arc of the pedal arms is substantially 90°.

5. The invention claimed in claim 1 or claim 2, which further includes shock-absorbing means to establish the limits to arcuate travel of the pedal arms and to cushion the arms during deceleration of their arcuate movement.

6. A bicycle comprising:

a frame, a drive wheel mounted on the frame, a steering wheel mounted on the frame, a drive sprocket mounted on the frame, endless means drivingly connecting the sprocket to the drive wheel, two pedal arms pivotally mounted on either side of the frame for swinging movement over an arc of less than 180°, slip-clutch means between each pedal arm and the driving sprocket whereby downward force exerted on a pedal arm exerts rotational torque on the driving sprocket, and means for positively raising one pedal arm as the other is depressed, said means including first and second arcuate toothed members secured to the respective pedal arms, a first gear meshing with the first toothed member, the first gear being fixedly mounted to a transverse rotary shaft on which is also fixedly mounted a second gear, the second gear meshing with a third gear which also meshes with the second toothed member.

7. The invention claimed in claim 6, in which the pitch diameter of the first toothed member is greater than that of the second toothed member, and in which the pitch diameter of the first gear is greater than that of the second gear, the pitch diameter ratio for the toothed members being the same as the pitch diameter ratio of the first and second gears.

8. The invention claimed in claim 7, in which the third gear has the same pitch diameter as the second gear.

9. The invention claimed in claim 6 or claim 7, in which the swing arc of the pedal arms is substantially 90°.

10. The invention claimed in claim 6 or claim 7, which further includes shock-absorbing means to establish the limits of arcuate travel of the pedal arms and to cushion the arms during deceleration of their arcuate movement.

* * * * *